(12) United States Patent
Dohi

(10) Patent No.: US 8,201,358 B2
(45) Date of Patent: Jun. 19, 2012

(54) FISHING HOOK

(75) Inventor: Yoshiro Dohi, Kato (JP)

(73) Assignee: Dohitomi & Co., Ltd., Hyogo-Ken (JP)

( * ) Notice: Subject to any disclaimer, the term of this patent is extended or adjusted under 35 U.S.C. 154(b) by 175 days.

(21) Appl. No.: 12/069,068

(22) Filed: Feb. 7, 2008

(65) Prior Publication Data

US 2009/0000179 A1   Jan. 1, 2009

(30) Foreign Application Priority Data

Jun. 28, 2007   (JP) ................ 2007-004924

(51) Int. Cl.
*A01K 83/00* (2006.01)
(52) U.S. Cl. ........................................... 43/43.16
(58) Field of Classification Search .............. 43/43.16, 43/44.82, 44.2, 44.8
See application file for complete search history.

(56) References Cited

U.S. PATENT DOCUMENTS

| | | | | |
|---|---|---|---|---|
| 58,404 A * | 10/1866 | Goodwin | ........................ | 43/44.8 |
| 385,913 A * | 7/1888 | Hunter | ........................ | 43/44.8 |
| 523,988 A * | 8/1894 | Martin | ........................ | 43/43.16 |
| 531,140 A * | 12/1894 | Stapp | ........................ | 43/44.8 |
| 620,896 A * | 3/1899 | Edgar | ........................ | 43/43.16 |
| 666,309 A * | 1/1901 | Fiege | ........................ | 43/44.82 |
| 779,843 A * | 1/1905 | Fredricks | ........................ | 43/43.16 |
| 842,594 A * | 1/1907 | Van Vleck | ........................ | 43/43.16 |
| 911,040 A * | 2/1909 | Hickey | ........................ | 43/44.8 |
| 991,745 A * | 5/1911 | Randal | ........................ | 43/44.8 |
| 1,333,148 A * | 3/1920 | Anderson | ........................ | 43/43.16 |
| 2,101,491 A * | 12/1937 | Chilcott | ........................ | 43/43.16 |
| 2,115,493 A * | 4/1938 | Johannes | ........................ | 43/44.8 |
| 2,233,863 A * | 3/1941 | Driscoll | ........................ | 43/43.16 |
| 2,423,899 A * | 7/1947 | Odgard | ........................ | 43/44.2 |
| 2,523,833 A * | 9/1950 | Lando | ........................ | 43/44.82 |
| 2,599,684 A * | 6/1952 | Bakken | ........................ | 43/44.2 |
| 2,636,306 A * | 4/1953 | Sokolik | ........................ | 43/44.8 |
| 2,668,387 A * | 2/1954 | Gallardo | ........................ | 43/44.82 |
| 2,816,392 A * | 12/1957 | Goldberg et al. | ........................ | 43/43.16 |
| 2,823,485 A * | 2/1958 | Traumuller | ........................ | 43/43.16 |
| 2,828,573 A * | 4/1958 | Larsen | ........................ | 43/44.2 |
| 2,836,922 A * | 6/1958 | Cox | ........................ | 43/44.2 |
| 2,841,914 A * | 7/1958 | Butler | ........................ | 43/43.16 |
| 2,861,383 A * | 11/1958 | Gray | ........................ | 43/43.16 |
| 2,906,054 A * | 9/1959 | Morehead | ........................ | 43/43.16 |
| 2,911,752 A * | 11/1959 | Leppich | ........................ | 43/43.16 |
| 2,962,833 A * | 12/1960 | Stinson | ........................ | 43/44.8 |
| 2,972,832 A * | 2/1961 | Anselmi | ........................ | 43/44.8 |
| 3,026,647 A * | 3/1962 | Rainey | ........................ | 43/44.8 |
| 3,027,677 A * | 4/1962 | Low | ........................ | 43/43.16 |
| 3,034,250 A * | 5/1962 | Laba | ........................ | 43/44.8 |
| 3,061,968 A * | 11/1962 | Stroud | ........................ | 43/44.8 |
| 3,492,752 A * | 2/1970 | Viveiros | ........................ | 43/44.8 |
| 3,624,690 A * | 11/1971 | Ashley | ........................ | 43/43.16 |
| 4,028,838 A * | 6/1977 | Flower | ........................ | 43/43.16 |
| 4,126,956 A * | 11/1978 | Bayer | ........................ | 43/44.2 |

(Continued)

FOREIGN PATENT DOCUMENTS

EP   199157 A1 *   10/1986

(Continued)

*Primary Examiner* — Darren W Ark
(74) *Attorney, Agent, or Firm* — DLA Piper LLP (US)

(57) ABSTRACT

A plurality of grooves are formed at a position in a hook tip where a barb is to be generally provided, avoiding damage to a caught fish and avoiding fishing failure.

4 Claims, 1 Drawing Sheet

U.S. PATENT DOCUMENTS

| | | | | |
|---|---|---|---|---|
| 4,126,957 A | * | 11/1978 | Randall | 43/43.16 |
| 4,349,979 A | * | 9/1982 | Strantz | 43/44.8 |
| 4,715,142 A | * | 12/1987 | Richard | 43/43.16 |
| 4,723,372 A | * | 2/1988 | Moser | 43/43.16 |
| 4,757,634 A | * | 7/1988 | Meixsell, Jr. | 43/43.16 |
| 4,768,304 A | * | 9/1988 | Preiser | 43/43.16 |
| 4,802,300 A | * | 2/1989 | Fujii et al. | 43/43.16 |
| 4,827,657 A | * | 5/1989 | Slehofer | 43/44.2 |
| 4,858,371 A | * | 8/1989 | Preiser | 43/43.16 |
| 4,922,649 A | * | 5/1990 | Mitchell | 43/43.16 |
| 4,953,321 A | * | 9/1990 | Furuta | 43/43.16 |
| 4,998,375 A | * | 3/1991 | Mitchell | 43/43.16 |
| 5,097,622 A | * | 3/1992 | James | 43/43.16 |
| 5,113,616 A | * | 5/1992 | McManus | 43/43.16 |
| 5,117,575 A | * | 6/1992 | Desmond | 43/44.8 |
| 5,214,875 A | * | 6/1993 | Hoben et al. | 43/43.16 |
| 5,241,775 A | * | 9/1993 | Matsumura | 43/43.16 |
| 5,526,603 A | * | 6/1996 | Fujii et al. | 43/43.16 |
| 5,528,850 A | * | 6/1996 | Lindstrom | 43/43.16 |
| 5,685,108 A | * | 11/1997 | Lepage et al. | 43/43.16 |
| 5,890,316 A | * | 4/1999 | Rodgers et al. | 43/43.16 |
| 6,038,806 A | * | 3/2000 | Maitland | 43/43.16 |
| 6,085,456 A | * | 7/2000 | Battaglia | 43/43.16 |
| 6,085,457 A | * | 7/2000 | Kishida | 43/43.16 |
| 6,237,277 B1 | * | 5/2001 | Hildman | 43/43.16 |
| 6,282,831 B1 | * | 9/2001 | Hugunin et al. | 43/43.16 |
| 6,289,628 B1 | * | 9/2001 | Perez | 43/43.16 |
| 6,334,273 B2 | * | 1/2002 | Turner et al. | 43/43.16 |
| 6,405,477 B1 | * | 6/2002 | Huppert | 43/44.8 |
| 6,560,916 B1 | * | 5/2003 | Maxim | 43/43.16 |
| 6,637,148 B1 | * | 10/2003 | Stallings | 43/44.8 |
| 6,898,895 B2 | * | 5/2005 | Mendoza et al. | 43/44.82 |
| 7,114,279 B2 | * | 10/2006 | Brauner et al. | 43/53.5 |
| 7,225,582 B2 | * | 6/2007 | Shay | 43/43.16 |
| 2002/0032979 A1 | * | 3/2002 | Hildman | 43/43.16 |
| 2002/0050093 A1 | * | 5/2002 | Bahery | 43/43.16 |
| 2002/0124456 A1 | * | 9/2002 | Mendoza | 43/44.82 |
| 2003/0182843 A1 | * | 10/2003 | Smart et al. | 43/44.2 |
| 2005/0076557 A1 | * | 4/2005 | Fujii | 43/43.16 |
| 2006/0265938 A1 | * | 11/2006 | Heggeness | 43/43.16 |
| 2008/0047192 A1 | * | 2/2008 | Bennis | 43/44.8 |
| 2009/0188150 A1 | * | 7/2009 | Tomich et al. | 43/43.16 |

FOREIGN PATENT DOCUMENTS

| | | | | |
|---|---|---|---|---|
| EP | 380735 A1 | * | 8/1990 | |
| GB | 2383932 A | * | 7/2003 | |
| JP | 04079825 A | * | 3/1992 | |
| JP | 07289120 A | * | 11/1995 | |
| JP | 08056534 A | * | 3/1996 | |
| JP | 08089135 A | * | 4/1996 | |
| JP | 3026052 B | | 7/1996 | |
| JP | 09121719 A | * | 5/1997 | |
| JP | 2000316424 A | * | 11/2000 | |
| JP | 2001028969 A | * | 2/2001 | |
| JP | 2001128591 A | * | 5/2001 | |
| JP | 2002209475 A | * | 7/2002 | |
| JP | 2003102337 A | * | 4/2003 | |
| JP | 2003189760 A | * | 7/2003 | |
| JP | 2004121204 A | * | 4/2004 | |
| JP | 2004129645 A | * | 4/2004 | |
| JP | 2004242648 A | * | 9/2004 | |
| JP | 2005130771 A | * | 5/2005 | |
| JP | 2005224236 A | * | 8/2005 | |
| JP | 2005253461 A | * | 9/2005 | |
| JP | 2006094843 A | * | 4/2006 | |
| JP | 2006129858 A | * | 5/2006 | |
| JP | 2006141221 A | * | 6/2006 | |
| JP | 2006223288 A | * | 8/2006 | |
| JP | 2007053997 A | * | 3/2007 | |
| WO | WO 9704648 A1 | * | 2/1997 | |
| WO | WO 9807312 A1 | * | 2/1998 | |

* cited by examiner

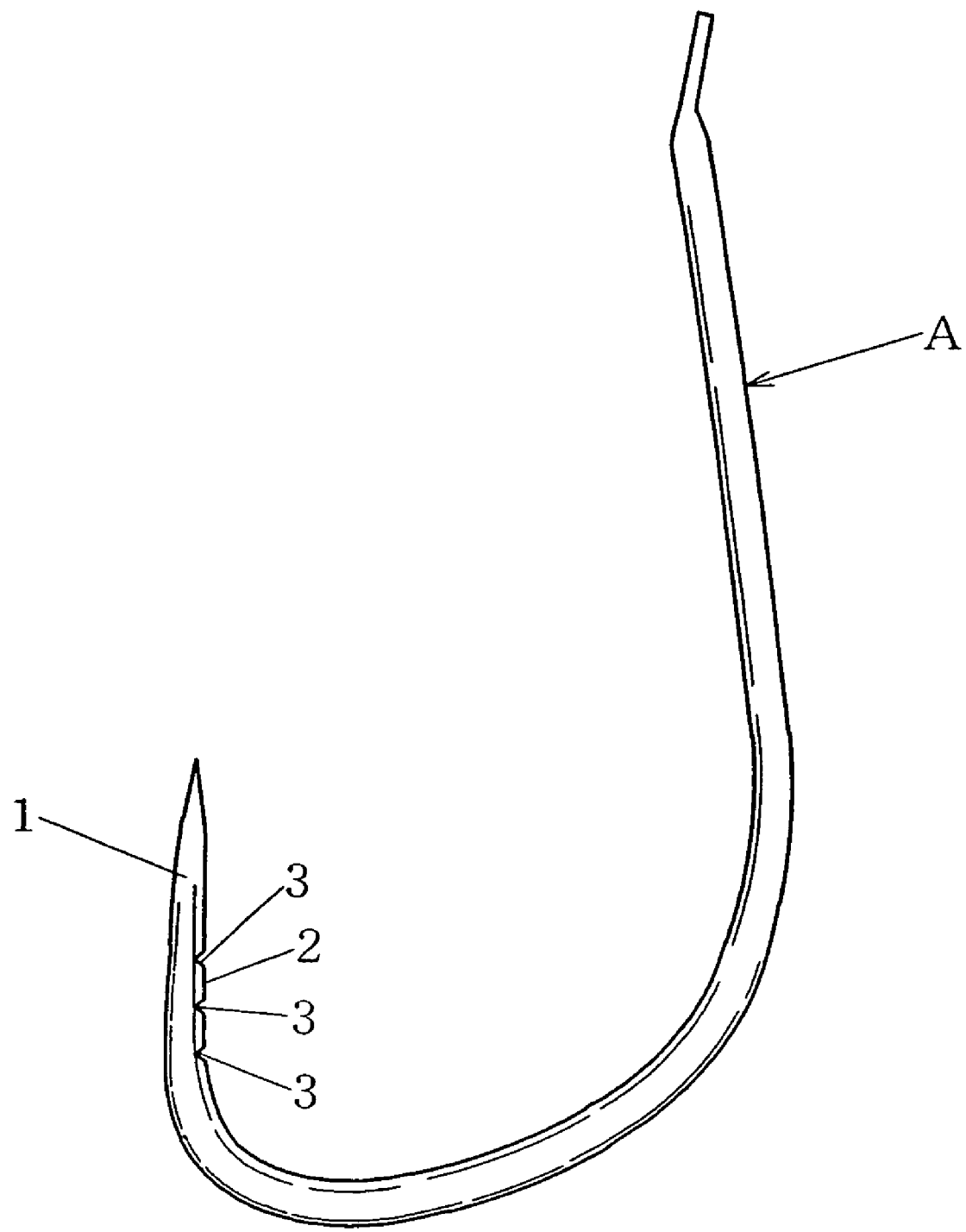

FISHING HOOK

BACKGROUND OF THE INVENTION

1. Field of the Invention

The present invention relates to a fishing hook in which a barb, which is generally provided, is not provided in a hook tip, a so-called barbless hook.

2. Description of the Related Art

In recent years, sport fishing has become popular, and a practice of so-called catch and release in which a caught fish is released to the place where it was caught has become common. To keep such a practice, care should be taken to avoid damage to a caught fish.

Barbless hooks have been invented for that purpose, which have been long used for fishing salmon or trout in the West. With the barbless hook, a caught fish can be released in a good condition without being damaged, and thus the barbless hook is an optimum fishing hook for keeping the practice.

However, in use of the barbless hook, inexperience may cause fishing failure because a barb, which is generally provided, is not provided in a hook tip. In order to avoid the failure, a fishing hook has been proposed in which a plurality of grooves in the form of a spiral, an X-shaped spiral, or a ring are formed in a shank near a hook tip (see, for example, Japanese Utility Model Registration No. 3026052).

This may avoid fishing failure, but the grooves are formed all around the shank, which may not be suitable for preventing damage to a caught fish.

BRIEF SUMMARY OF THE INVENTION

The present invention has an object to provide an ideal fishing hook that can meet contradictory needs of avoiding damage to a caught fish and avoiding fishing failure.

In order to achieve the above described object, in the present invention, a plurality of grooves are formed at a position in a hook tip where a barb is to be provided. This can meet contradictory needs of avoiding damage to a caught fish and avoiding fishing failure.

A smaller number of grooves are preferably formed in a small-sized hook. For example, it is preferable that about five grooves are formed in a relatively large-sized hook, and about three grooves, which are smaller in number, are formed in a small-sized hook. This allows grooves to be easily formed in the small-sized hook.

According to the present invention, contradictory needs can be met of avoiding damage to a caught fish and avoiding fishing failure.

In addition, according to the present invention, grooves can be easily formed in a small-sized hook.

BRIEF DESCRIPTION OF THE SEVERAL VIEWS OF THE DRAWINGS

FIG. 1 is shows a fishing hook according to one embodiment of the present invention.

DETAILED DESCRIPTION OF THE INVENTION

An embodiment of a fishing hook according to the present invention will be described with reference to the drawings.

As shown in FIG. 1, a plurality of grooves 3 and 3 are formed at a position 2 in a hook tip 1 of a fishing hook A where a barb is to be generally provided. This avoids damage to a caught fish and fishing failure. These two contradictory needs can be met by the ideal fishing hook having the above described configuration. The grooves 3 extend in the direction perpendicular to the axis of the hook tip 1 of the fishing hook A, thus being substantially horizontal. The cross-section of each one of the grooves 3 is in a V-shape in the shown embodiment; and it can be of U or any desired shape; and in addition, the depth, the cross-sectional shape and the horizontal length of the plurality of grooves 3 can be the same for all the grooves 3 or can be different from each other.

The groove 3 is preferably as thin and shallow as possible. This can further avoid damage to a caught fish, and also the fishing hook becomes hard to break as compared with the case where the groove 3 is thick and deep.

The number of the grooves 3 is preferably about three to five, and a smaller number of grooves are preferably formed in a small-sized hook. For example, it is preferable that about five grooves are formed in a relatively large-sized hook, and about three grooves, which are smaller in number, are formed in the small-sized hook. This allows grooves to be easily formed in the small-sized hook.

Thus, the plurality of grooves 3 are formed at the position 2 in the hook tip 1 of the fishing hook A where a barb is to be generally provided. This avoids damage to a caught fish and fishing failure.

The embodiment described above is an example of the best mode for carrying out the present invention, and in carrying out the present invention, the shape of each part is not limited to the shown example, but various design choices may be made according to the gist of the present invention.

For example, the drawing shows an eye of the fishing hook A having a general flattened shape, but the present invention may be applied to a ring-shaped (looped) eye. For the ring-shaped eye, the eye may be turned up or down with respect to the shank, or may be straight without being turned up or down.

The invention claimed is

1. A barbless curved fishing hook consisting of a shank, a bight and a hook tip end and a plurality of grooves formed into said bight of the hook at a position adjacent said hook tip end and in an inside surface of said bight facing said shank of said barbless curved fishing hook, and wherein each of said plurality of grooves is V-shaped in cross-section depressed in a direction orthogonal to said bight and formed by two surfaces of a same length intersecting at an acute angle with each of the two intersecting surfaces respectively intersecting said inside surface of said bight at an oblique angle.

2. The barbless fishing hook according to claim 1, wherein a number of said plurality of grooves comprises 3 to 5 grooves.

3. The barbless fishing hook according to claim 1, wherein said plurality of grooves extend transversely to an axis of said hook tip.

4. The barbless fishing hook according to claim 1, wherein each of the plurality of grooves is depressed into said bight without projecting from a surface of said bight.

* * * * *